March 9, 1965   T. J. HORAN   3,172,769
PACKAGING ICED COMESTIBLES
Filed June 12, 1961   3 Sheets-Sheet 2

INVENTOR.
THOMAS J. HORAN
BY Jack M. Miller
AGENT

March 9, 1965     T. J. HORAN     3,172,769

PACKAGING ICED COMESTIBLES

Filed June 12, 1961     3 Sheets—Sheet 3

INVENTOR.
THOMAS J. HORAN
BY Jack M. Miller
AGENT

United States Patent Office 3,172,769
Patented Mar. 9, 1965

3,172,769
PACKAGING ICED COMESTIBLES
Thomas J. Horan, 3111 Rowena Drive,
Los Alamitos, Calif.
Filed June 12, 1961, Ser. No. 116,332
19 Claims. (Cl. 99—194)

This invention relates generally to a method of packaging iced comestibles and to an improved refrigerated package. More particularly, this invention relates to a new and improved eviscerated animal packing process and a new refrigerated package containing fresh eviscerated meat packed in ice.

The task of marketing perishable foodstuffs embraces many areas of commerce including assembling the raw comestibles from the producers; transporting to a central processor; preparing for consumption by such activities as cleaning, dressing, trimming, packaging and the like; holding or storing for market; and distributing the comestible to the retail outlet. The poultry industry represents a particular segment of the food industry which has standardized their handling of fresh eviscerated poultry carcasses to a great extent, and has always maintained high standards of sanitation and quality. Poultry processing standards should be kept high, particularly with respect to cleanliness, amount of viscera remaining upon eviscerating, time between killing and evisceration, time between evisceration and marketing, method of packaging, and the method of holding in storage so as to protect the quality of the product and ultimately the consumer. But, the present packaging methods used for cooled fresh poultry carcasses, and the resulting refrigerated poultry packages, all possess one or more common drawbacks which hamper the industry in maintaining a competitive position in the fresh meat field.

Conventionally, live poultry is transported to the processor where the birds are killed, bled, eviscerated, and plucked on a continuous conveyor. After the poultry has been drawn or eviscerated, it may be frozen quickly or the poultry carcasses can be cooled and packaged as fresh meat. In typical prior art packaging the poultry carcasses are segregated as to class, grade, color and weight. Carcasses of the same quality group are then put into containers for transportation. Typical containers include wood barrels, wood crates, and wood boxes which are both veneered and made of sawed lumber. The most common form of packaging uses wire bound wooden veneer boxes either with or without an ice packing. However, these wooden boxes are disadvantageous from a sanitation standpoint since the wood is readily soaked with blood and animal juices thus providing a breeding place for bacteria, flies, and other pests. The blood-soaked boxes are messy and odorous in the retail establishment and disposal of these bulky boxes is difficult and a source of pest attraction while in a trash compound. A further disadvantage in the use of the conventional wood boxes entails the hazard of materials leaching from the wood boxes when soaked with fluids and contacting the box contents. These leached substances are particularly deleterious to poultry taste and quality. From the standpoint of economics, the cost of using wood boxes is very high since the box is not returnable and therefore must be disposed of after emptying. This means each load of poultry must have the container cost included in the sales price. Thus, by not being returnable and because of soaking with blood, water, and animal juices, these wooden boxes give fresh poultry a serious economic handicap in competing in the fresh meat market.

It is a primary object of this invention to provide an improved comestible packaging process which produces a new refrigerated package particularly suitable for preserving fresh meat during transportation from processor to retainer and institutional consumer.

Another object of this invention is to provide an improved method of packing poultry whereby eviscerated poultry carcasses are adequately refrigerated over prolonged periods of transportation while being protected from exposure to atmospheric dirt and dust.

A further object of this invention is to provide an improved liner for refrigerated packages.

Another object of this invention is to provide an inexpensive, simple, efficient, and effective method of packing comestibles for shipment over long distribution routes in an iced condition.

A still further object of this invention is to provide a self-draining iced poultry package which prevents waterlogging of refrigerated eviscerated fowl and further prevents tearing and bruising of the poultry meat.

Another object of this invention is to provide an improve poultry packing process which produces a superior iced poultry packaged shipping unit that is stronger, more readily transportable, less expensive, cleaner, more attractive, and more easily handled than conventional poultry packages.

A further object of this invention is to provide an improved transportation package containing iced poultry which has sufficient structural strength to allow extensive stacking, has a disposable liner, and has a returnable nesting metal basket.

Other objects and advantages of this invention will become apparent to those skilled in the art as the description and illustration thereof proceed.

I have now found that the foregoing objects and their attendant advantages can be particularly realized in a comestible packaging process wherein returnable free-draining metal baskets or containers, preferably of the nesting and stacking type, are lined with a fluid draining sheet liner and a comestible is packed therein with a crushed or chipped refrigerant such as ice and the filled container is covered to protect the contents from contact with dust and dirt.

The improved process and refrigerated packages of my invention can best be understood with reference to the accompanying drawings, which form a part of this application; and the subsequent description thereof.

It is to be understood that although the packaging process of my invention and the refrigerated packages resulting therefrom are broadly applicable to the handling of any comestible, they are particularly applicable to the handling of fresh meat. Thus, although the packaging method and the resulting refrigerated containers are specifically described in connection with poultry processing, the process and packages can also be used in the handling of any putrefiable foodstuffs such as fresh vegetables, fresh fruits, and fresh meats such as the carcasses of rabbits, fish, shrimp, lobster, crab, and the like as well as fresh eviscerated poultry such as chickens, turkeys, ducks, and the like.

Figure 1:
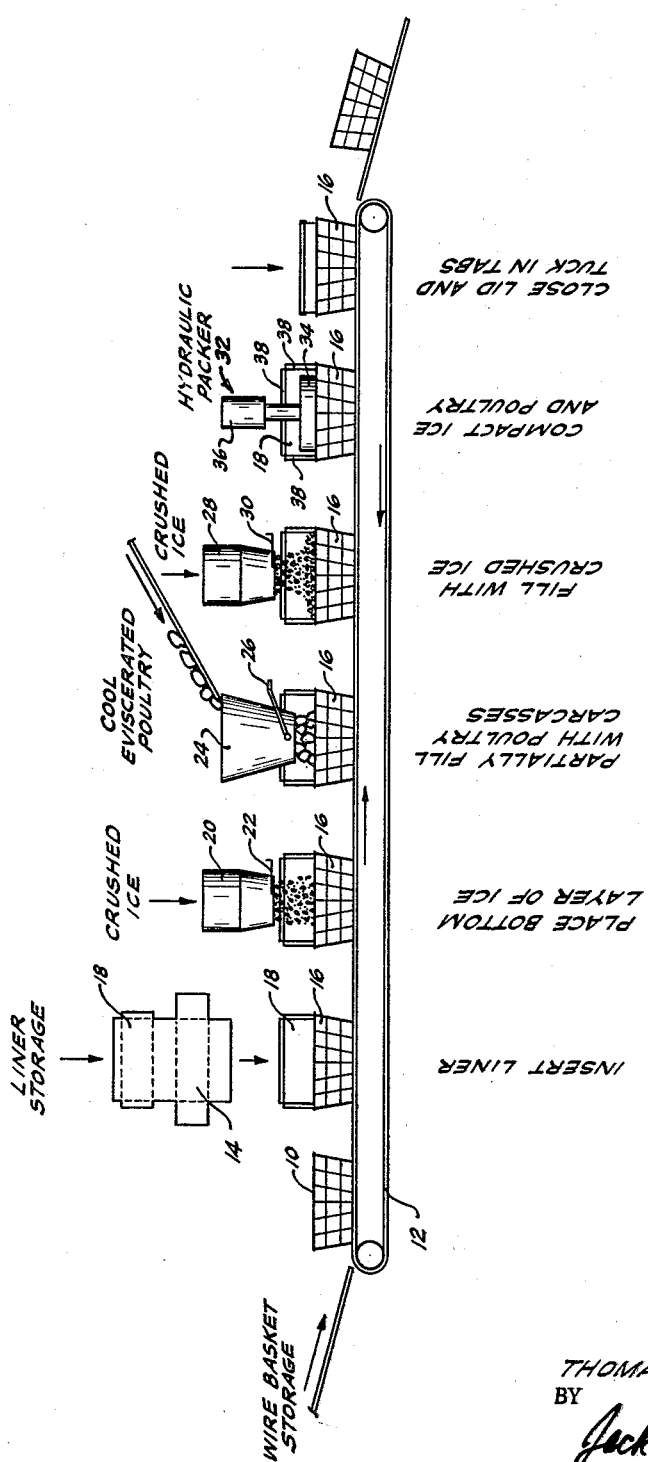
FIGURE 1 is a schematic flow diagram of my packaging process.

Referring now more particularly to FIGURE 1, the method of the present invention is described in terms of a specific example as applied to the packaging of fresh eviscerated chickens for transport from the poultry processor to the retail outlet. The particular process herein described essentially comprises: (1) lining a metal wire basket with a sheet material; (2) depositing a layer of ice in the bottom of the lined basket; (3) partially filling the lined basket, having a bottom layer of ice, with cooled fresh eviscerated poultry; (4) filling the remainder of the space in the partially filled lined basket with ice; (5) compacting the ice and poultry into a consolidated mass; and (6) covering the filled lined basket with a cover to protect the contents from soiling.

First, a substantially rectangular metal retaining basket 10, having both nesting and stacking characteristics, is removed from basket storage (not shown) in a clean condition, and placed on conveyor belt 12 and carried into position for insertion of liner 14. Although wire construction as illustrated is preferable for basket 10, other structural forms such as metal plates with drainage holes, expanded metal lath and the like can be used. Baskets 10 or other alternate containers are preferably both stacking and nesting in their structural characteristics, but neither feature is absolutely necessary for operability. Thus, basket 10 can actually be any metal container having sufficient drainage for removing water, blood, and animal juices from the container. Furthermore, although the generally rectangular form shown for basket 10 is preferable, other geometric forms such as cylinders, truncated cones, cubes, and the like can be used in the design of retaining basket 10. A particularly suitable basket has a flat sheet metal bottom with suitable openings for drainage. Such a flat metal bottom permits using the basket on conveyors with rollers and the like which often will catch on a wire mesh basket bottom.

Figure 10:
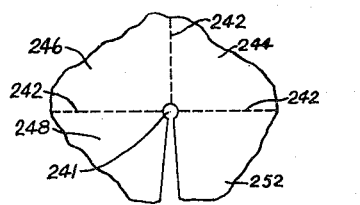
FIGURE 10 is an expanded view of a portion of one of the four bottom corners of the liner of FIGURE 8 showing a fluid drainage passageway in the apex of the liner corner.

Liner 14 is positioned inside of basket 10 so as to fit tightly into the interior of basket 10, thus forming container 16. The liner 14 is inserted by forcing that portion of the liner which is the bottom down toward the bottom of basket 10. As this is done, liner 14 folds at creased points so that the sides of liner 14 are forced into a vertical position by the sides of basket 10. Thus, when the bottom of liner 14 rests on the bottom of basket 10, the entire inside surface of basket 10 is lined. Liner 14 in this example is a heavy bleached sulphate paper that has been cold-waxed on both sides. However, liner 14 can comprise any foldable sheet material that is moisture-resistant, i.e., retains sufficient structural strength in the presence of moisture to retain particulate refrigerant, e.g., ice, and the refrigerated contents over prolonged periods of time, i.e., up to 48 hours or more. Typical sheet liner materials are paper, waxed paper, plastic-lined paper cardboard, waxed cardboards, corrugated papers, paperboards, cloth, waxed and plastic-lined corrugated papers, metal foil such as aluminum, and plastic sheet materials such as polyethylene, vinyl, and the like as well as combinations of any of the above sheet materials. An important feature of liner 14 is that it must be sufficiently foraminous, either by construction or inherent porosity, to provide drainage for meat fluids, blood, and melting refrigerant such as water from melting ice. However, the openings must be small enough to retain the crushed ice and other contents within container 16. This liner drainage is often provided, as in this example, by not joining the vertical corners formed when liner 14 is folded into its upright box shape to fit retaining basket 10. Thus, fluid can drain from the slots at each corner of container 16 which prevents waterlogging and fluid soaking of the chicken carcasses. Since these fluids are particularly susceptible to putrefaction, fluid drainage without absorption by container 16 is particularly desirable. Other means of providing drainage in liner 14 are punching holes, openings, orifices, or slots small enough to retain the crushed ice, but sufficient to allow liquid flow. A particularly preferred liner is one which has vertical corners resulting from retaining flaps or tabs, hereinafter described in more detail in relation to FIGURES 8 and 10, so as to completely retain the solids contents, but with drainage passageways provided in the apex of the corners as shown in FIGURE 10, around the flaps, and sometimes by openings in the bottom of the liner. Liner 14 is shown with attached lid 18 which is used to cover filled container 16 as the last step in my packaging process. However, lid 16 does not have to be attached to liner 14, but can be a separate component of the package added as a cover at the final step in packaging.

Empty container 16 is carried by conveyor 12 to an initial preparatory icing step. A layer of ice, usually about 2 to 6 inches in depth, is placed on the bottom of container 16. The ice is usually crushed or chipped to a size range between about ⅛-inch and about ½-inch in mean diameter, but the ice can be cubed or otherwise subdivided into any appropriate particle size which will flow readily and pack easily. The crushed ice here is about ¼-inch in diameter and a predetermined amount flows from ice hopper 20 when handle 22 is pulled to provide the desired bottom ice layer in container 16. This initial ice layer is the first step in providing a preferred form of refrigerated package wherein the chicken in the package is completely surrounded by ice. However, this initial icing step is often omitted and empty container 16 passed directly to meat hopper 24.

Container 16, having its bottom covered with 4 inches of ice in this example, is then passed to meat hopper 24 for filling with cooled (about 35° F.) eviscerated poultry. Dressed birds commence to deteriorate within a few hours after being killed if allowed to remain at a temperature above about 35° F. In order to prevent rapid deterioration, poultry is usually cooled quickly after eviscerating to a temperature between about 32° F. and 40° F., and preferably to 32° F. However, in some processing environments, the poultry is packed while still warm and my process is applicable to carcasses near live poultry temperature as well as to cooled poultry. A predetermined weight of cooled chicken carcasses are dumped from meat hopper 24 onto the top of the layer of ice in container 16, thus partially filling the remaining space in container 16. Partially filled container 16 is then conveyed to a second crushed ice hopper 28 where the remaining space in container 16 is filled with crushed ice. Since crushed ice has a tendency to readily pack into a smaller bulk volume than the dumped bulk volume, container 16 is usually heaped with ice to compensate for the next step of compacting the filled container 16.

Container 16, heaped over its top with ice, is positioned under hydraulic packer 32 comprising a platen 34, which is slightly smaller than the top of container 16, connected to a conventional hydraulic ram 36. Platen 34 forces the heaped ice down into container 16, thus packing the ice and chicken carcasses together like a snowball so as to form a compact integral mass which is no longer flowable. After transport and holding periods as long as 40 hours, the compacted ice and birds in container 16 are found to still be a structurally solid continuous mass having adequate porosity to allow liquid drainage but being sufficiently solid to prevent any shifting or bruising of the chicken within the package as well as to prevent ice or poultry loss through the unconnected vertical corners.

Lid 18 is then folded over the compacted ice and chicken mass in container 16 to protect the contents from soiling. Lid 18, hinged by a creased fold to liner 14, is positioned down over the contents of container 16 with tabs 38 fitting between basket 10 and the walls of liner 14. Any liquid flowing from one refrigerated package stacked above another refrigerated package will pass over the top of lid 18, past tabs 38, and down the outside of liner 14, thus preventing any liquid drainage from one package contacting the contents of a lower package in a stack. The packaging process as set forth in FIGURE 1 usually takes about 10 minutes for completion, but the packaging time can run from about 2 minutes to about 20 minutes or more.

Figure 2:
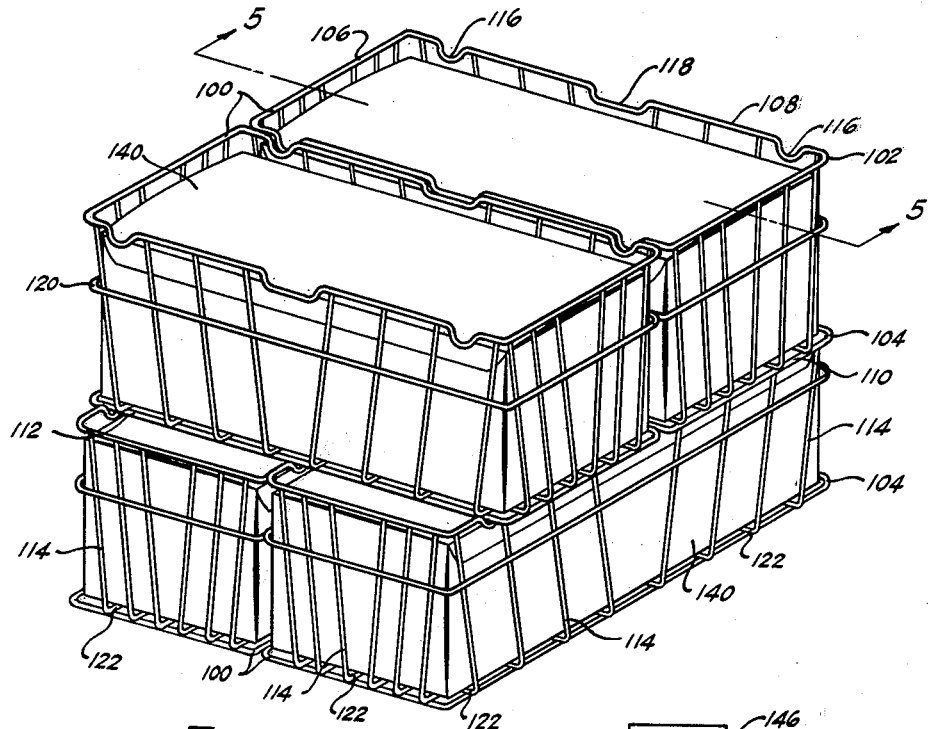
FIGURE 2 is an illustration in perspective of a stacked set of four refrigerated containers of this invention, each comprising poultry and ice in a lined cross-stacking, nesting wire basket.
Figure 3:
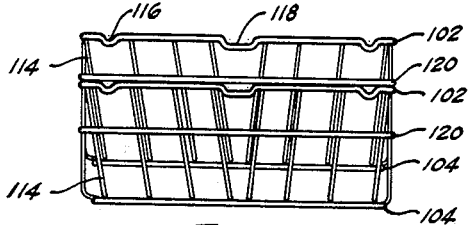
FIGURE 3 is a side view of two empty wire baskets of FIGURE 2 in nesting position.

A specific embodiment of my refrigerated package is shown in FIGURES 2, 3, 4 and 5. Basket 100 is a cross-stacking nesting wire basket which can be cross-stacked, as shown in FIGURE 2, when lined and filled with ice and poultry, or can be nested when empty as shown in FIGURE 3. A typical basket of this type, weighing about 8.5 pounds, has top dimensions of about 28 inches by 13¼ inches, bottom dimensions of about 27 inches by 13 inches, and a depth of about 11 inches. Basket 100, a style of basket that is illustrated and described in somewhat more detail in U.S. Patent No. 2,964,211, comprises a substantially rectangular top support 102 of heavy wire, typically a cold drawn steel wire about 0.30-inch in diameter, and a substantially rectangular bottom support 104 of the same heavy wire. Top support 102 has ends 106 and side 108, ends 106 being substantially shorter than sides 108. Bottom support 104 has ends 110 and sides 112. Ends 106 and sides 108 of top support 102 are slightly longer than the corresponding ends 110 and sides 112 of bottom support 104. Top support 102 and bottom support 104 are aligned substantially parallel to one another and are held in this relationship by framing members 114 which form the sides of basket 100.

Each side 108 of top support 102 has end recesses 116 adjacent each end and a central recess 118. These recesses 116 and 118 are spaced from each other a distance slightly less than the length of end 110, thus allowing sides 112 of bottom support 104 to rest firmly in both recesses 116 and 118, thus permitting the interlocking cross-stacking shown in FIGURE 2.

Framing members 114, typically made of cold drawn steel wire with a diameter of about 0.19-inch, are in a plane substantially perpendicular to the planes of top support 102 and bottom support 104, with each of framing members 114 arranged symmetrically in a downwardly tapering arrangement whereby each of framing members 114 converge towards the center of the basket as framing member 114 extends from top support 102 to bottom support 104.

Since framing members 114 of adjacent nesting baskets are symmetrical, they mate when the baskets are nested as shown in FIGURE 3. The opening at the top of basket 100 must, of course, be slightly larger than the overall dimensions of the bottom of basket 100 so as to allow nesting of one basket in the other as shown in FIGURE 3. Middle support 120 is substantially identical to top support 102 except support 120 has no recesses. Support 120 is positioned about ⅓ of the way down from top support 102 on framing members 114, and serves to limit the nesting of the baskets (see FIGURE 3) to prevent jamming and sticking. Bottom members 122 provide the bottom or base for basket 100 and run from a side 112 to an opposing side 112 and from an end 110 to an opposing end 110. Usually a continuous piece of wire forms opposing side framing members 114 and a bottom member 112.

Cross-stacking with the above-described basket 100 comprises placing two baskets 100 side-by-side. The next two baskets 100 on the stack are aligned side-by-side on top of the first two baskets 100 with their longest dimension oriented 90° from the longest dimension of the first two or bottom baskets 100. The bottom supports 104 of the top baskets fit into recesses 116 and 118 in top supports 102 of the bottom baskets 100. Thus, the containers are cross-stacked and by reason of the interlocking nature of baskets 100, a stack of baskets 100 is produced which affords a maximum of resistance to slipping or shifting.

Figure 4:
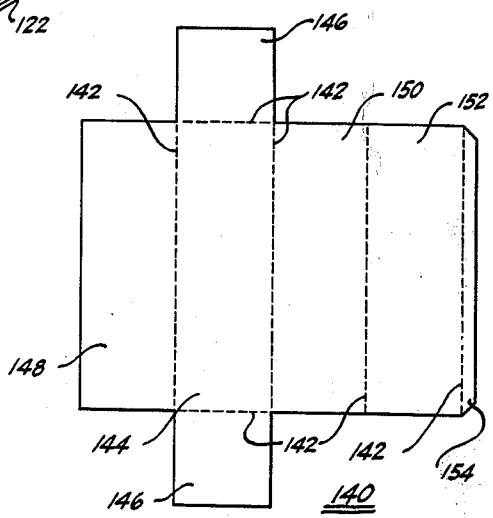
FIGURE 4 is a reduced plan view of the liner of FIGURE 2 laid out in a flat unfolded or unassembled position.

Liner 140 in this example, shown in FIGURE 4, is cut from a generally rectangular blank of bleached white sulphate cold-waxed paper having an approximate thickness of about 0.015-inch. An alternate material which has been used for this liner 140 service is a 125-pound test corrugated (type B corrugation) paper which is hot-waxed on both sides. Liner 140 can, of course, be made of any suitable foraminous or porous sheet material which allows drainage of the fluids normally emanating from iced comestible contents typically held within the assembled liner 140. Liner 140, when suitably folded at folds 142, forms a box-like container as shown inside of basket 100 in FIGURES 2 and 5. Bottom 144 of liner 140 has end walls 146 attached to each extremity by creased fold 142. End walls 146, when folded upward to a substantially vertical position from the horizontal plane of bottom 144, form the ends of the box shown as assembled liner 140 in FIGURE 2. Side walls 148 and 150 are attached by folds 142 to the sides of bottom 144. Side walls 148 and 150, when folded upward to a substantially vertical position from the horizontal plane of bottom 144, form the sides of the box-like structure of assembled liner 140. Liner 140 is generally sized to fit snugly within basket 100, thus forming a box-like liner having drainage slits at the vertical corners where side and end walls meet and with a lid 152 superimposed above and substantially parallel to bottom 144.

Lid 152 is attached to side wall 150 by a fold 142. Lid 152 during assembly is folded over towards side 148, usually until it contacts the top edge of vertical side 148, thus forming the top of the box-like structure of assembled liner 140. Tab 154, attached to lid 152 by a fold 142, is turned downward from lid 152 to form a closure which overlaps the outside of the top edge of vertical side 148 as shown in FIGURE 2. Tab 154 can be of any width, but usually is from about 2 to about 6 inches wide. Lid 152 can be attached to the top edge of either end wall 146 or side wall 148 as well as to side wall 150 as illustrated. Also, lid 152 can be unattached to any of the walls of the liner, thus forming a separate top. When separate, lid 152 will usually have tabs 154 on all four edges, each tab being used as previously described and illustrated.

Figure 5:
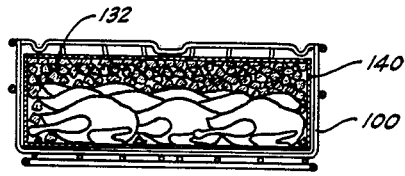
FIGURE 5 is a view in cross-section of one refrigerated container taken along line 5—5 of FIGURE 2 showing the contained ice and poultry.

FIGURE 5, showing a cross-section of one of the containers in FIGURE 2 illustrates basket 100 with liner 140 forming a container for ice 132 and chicken carcasses 134. The mass of chicken carcasses 134 are covered by ice 132 thus forming a relatively compact refrigerated mass.

Another embodiment of the refrigerated container of my invention is shown in FIGURES 6, 7, 8 and 9. Basket 200 is similar in construction to basket 100 in every respect except for additional bails 204 and a different top support 202, corresponding in location to top support 102 of basket 100, but top support 202 does not have any depressions such as recesses 116 and 118 of basket 100.

Figure 6:
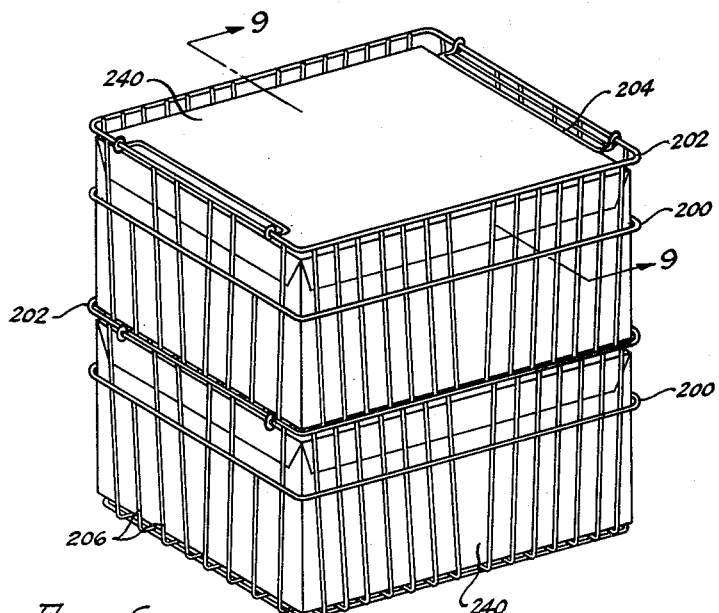
FIGURE 6 is an illustration in perspective of a stacked set of two refrigerated containers of this invention each comprising poultry and ice in a bail-stacking, nesting wire basket.
Figure 7:
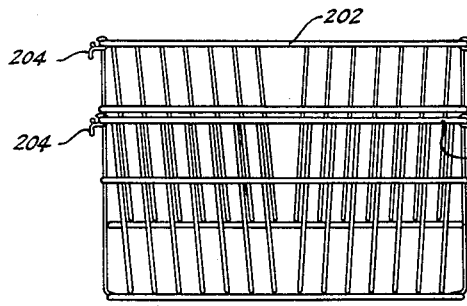
FIGURE 7 is a side view of two empty wire baskets of FIGURE 6 in nesting position.

Bails 204 are rotatably attached to top support 202 and, when located in their inside position, are used to support a filled top basket 200, as shown in FIGURE 6. Thus, when the lid of liner 240 is closed after packing, the bails 204 are flipped to the inside of basket 200. The next filled basket 200 is placed on top, the bottom of the top basket 200 resting on the bails 204 of the bottom basket 200. The bails 204 rest against the inside of end framing members 206 of basket 200 and the top basket 200 is countersunk slightly into the lower basket 200 thus eliminating any sliding of top basket 200. This type of stacking is particularly advantageous since a hand truck can readily be used for moving a stack of several such bail-stacked containers. When baskets 200 are emptied, the bails 204 are flipped to their outer position as shown in FIGURE 7, thus allowing nesting of these baskets 200 as described previously in relation to baskets 100 shown in FIGURE 3.

Figure 8:
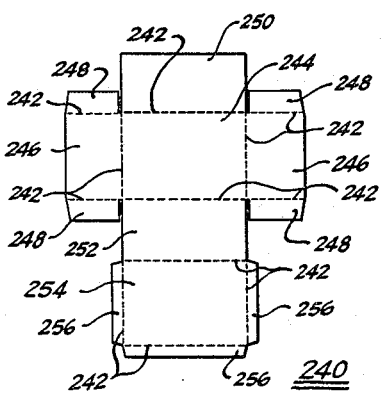
FIGURE 8 is a reduced plan view of the liner of FIGURE 6 laid out in a flat unfolded or unassembled position.

Liner 240 in this example, shown in FIGURE 8, is cut from a generally rectangular blank of heavy bleached white sulphate paper which has been polyethylene coated on one side and cold-waxed on the opposite side of the sheet. Liner 240 can alternatively comprise any suitable sheet material. When liner 240 is suitably folded at creased folds 242, the completed assembly is a box-like container as shown inside of basket 200 in FIGURE 6. Folds 242 are made by creasing or scoring the liner or making the liner susceptible to folding by other suitable techniques. Bottom 244 of liner 240 has tabbed end walls 246 attached (hinged) to opposite ends by folds 242. When the end panels or end walls 246 are folded upward to a substantially vertical position in relation to the horizontal plane of bottom 244, these end walls 246 form the ends of the box of assembled liner 240 as shown in FIGURE 6. Retaining tabs 248 are attached to each side of an end wall 246 by folds 242. Retaining tabs 248 are folded inwardly towards bottom 244 until they are substantially perpendicular to the plane of end wall 246, thus forming a corner in the box structure of assembled liner 240 which is continuous and not slotted as the vertical corners of previously described assembled box liner 140. Side walls 250 and 252, attached to bottom 244 by folds 242, form the sides of the box-like structure of assembled liner 240 when folded upward to a substantially vertical position in relation to the horizontal plane of bottom 244. Side walls 250 and 252 overlap the outside of the assembled retaining tabs 248 and are positioned parallel and adjacent thereto when assembled so as to complete the four walls of the box formed by liner 240.

Lid 254 of liner 240 is attached to side wall 252 by a fold 242. Lid 254 can be attached to the top edge of either end wall 246 or side wall 250 as well as to side wall 252 as shown. Lid 254 is folded over towards vertical side 250 until lid 254 is substantially parallel to and superimposed above bottom 244. Closure tabs 256, attached to the three edges of lid 256 by folds 242, are then turned downward over the outside of the top edges of vertical end walls 246 and vertical side wall 250 as shown in FIGURE 6. Closure tabs 256 or retaining tabs 248 can be of any width but typically are from about 2 inches to about 6 inches wide. Liner 240 is sized to fit snugly within basket 200, thus forming a box-like liner having no open corners. This continuous corner provided by retaining tabs 248 prevents any escape of comestibles or particulate refrigerant from the interior of the assembled liner 240 while allowing the escape of fluids typically present. Since retaining tabs 248 are not glued or otherwise secured to other portions of liner 240 except by the aforementioned fold 242, fluids can readily flow around the retaining tabs 248 to pass from the interior of the assembled liner to the exterior. Retaining tabs 248 can be attached to any vertical edge of side walls 250 and 252 or of any end wall 246 as shown, or a combination of these.

FIGURE 10, a partial view of one of the four corners of a preferred embodiment of liner 240, illustrates drainage passageway 241. When liner 240 is assembled into a box-like container as shown in FIGURE 6, drainage passageways 241 form fluid drain openings at the apex of each corner of assembled liner 240.

Figure 9:
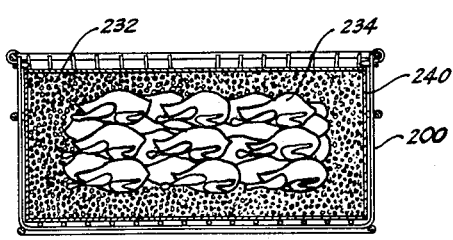
FIGURE 9 is a view in cross-section of one refrigerated container taken along line 9—9 of FIGURE 6 showing the contained ice and poultry.

FIGURE 9 illustrates a cross-section of one of the containers shown in FIGURE 6 and comprises a basket 200 with liner 240 forming a container holding ice 232 and chicken carcasses 234. The mass of meat 234 is completely surrounded by ice 232. The package as shown in FIGURE 9 illustrates the preferred comestible packing technique which completely encases the comestible in crushed ice.

In the use of wire baskets such as 100 and 200, the distance between the wires should be at a maximum and the wire size at a minimum which will provide sufficient structural strength for stacking to suitable heights for transport. The steel wire typically used for baskets such as 100 and 200 is usually finished with a plating such as 0.005 zinc, chromate conversion coat with baked acrylic clear coating to withstand maximum water exposure. The intersecting wires of baskets 100 and 200 are spot welded or otherwise suitably joined for maximum rigidity, stability and strength. The choice of wire size in the wire baskets is controlled primarily by the structural strength required when stacking several filled baskets vertically.

My packaging method and the resulting refrigerated container incorporate features most attractive to prudent poultry processors and retailers. Some of the more significant features include: (1) a more attractive refrigerated package than conventional wood boxes, thus providing an appearance which is desirable to processor, retailer, and the ultimate consumer alike; (2) a cleaner container providing no disposal problem thus overcoming the inherent unsanitary condition found with blood-soaked wood boxes; (3) the nesting of empty baskets which reduces storage space and return shipping space; (4) the insert is relatively inexpensive and disposable; and (5) the refrigerated package of this invention cannot impart deleterious tastes or otherwise reduce the quality of the comestible contents such as often occurs from fluid leaching of conventional wood containers.

Various other changes and modifications are apparent from the description of this invention and further modifications and changes are intended to be included within the scope of this invention as defined by the following claims.

I claim:

1. A method of packaging refrigerated meat which comprises: lining the interior of a foraminous metal container with a disposable foraminous sheet liner, said container and said liner being sufficiently foraminous to provide fluid drainage; filling said lined container with particulate ice and meat; and placing a lid on said container, said lid capping said liner and fitting within said container.

2. A method of packaging fresh meat for transport which comprises: lining a foraminous metal basket with a disposable foldable sheet material liner, said basket and said liner being sufficiently foraminous to provide fluid drainage; placing meat and ice within said lined metal basket; and covering the top of said filled liner with a lid so as to protect said meat and said ice from descending soil and fluids.

3. A method as defined in claim 2 wherein said metal baskets comprise substantially rectangular, stacking, nesting, wire baskets having a wire mesh construction with a mesh spacing sufficient to support said liner containing said meat and said ice.

4. A method as defined in claim 2 wherein said foldable sheet material liner is a heavy creased waxed paper.

5. A method as defined in claim 2 wherein said meat is poultry.

6. A method as defined in claim 5 wherein said poultry is chicken.

7. A method of packaging perishable meat in a refrigerated container which comprises: lining a metal wire mesh basket with a disposable moisture-resistant paper liner, said basket and said liner being sufficiently foraminous to provide fluid drainage; filling said lined wire mesh basket with meat and ice; and placing a moisture-resistant paper cover over said filled liner and within said basket.

8. A method as defined in claim 7 wherein a minor portion of said ice is placed as a shallow layer in the bottom of said lined basket, said perishable meat is placed on top of said ice to partially fill said lined basket, and the major portion of said ice is placed over and around said layer of perishable meat to complete filling said basket.

9. A method as defined in claim 8 including the additional step of compacting said ice and said meat so as to form a consolidated mass within said lined basket prior to placing said cover over said filled liner.

10. A process of packaging refrigerated comestibles which comprises: placing meat and ice into a disposably lined, nesting, stacking, metal wire mesh basket which allows liquid drainage; and covering said meat and said ice so as to exclude exterior dirt, dust, and liquids from contact with said meat and said ice.

11. The method of packaging perishable meats which comprises: folding a disposable moisture-resistant sheet material lining so as to cover the bottom and opposing walls of a rectangular metal wire mesh basket, said lining and said basket being sufficiently foraminous to provide fluid drainage; preparing a bottom layer of crushed ice upon the bottom of said lined basket; placing said perishable meat as a layer upon said bottom layer of crushed ice; filling at least a portion of the remaining volume of said lined basket with a predetermined amount of crushed ice; compressing said ice and said meat to form a compacted mass; and covering said filled lined basket with a lid so as to exclude dirt and dust from said meat and said ice, said lid fitting within the top of said basket.

12. A packaged shipping unit comprising: the combination of a meat, a particulate ice at least partially surrounding said meat; a disposable foraminous sheet liner encompassing said ice and said meat; and a foraminous metal container, said container being substantially filled by said liner, said ice, and said meat, said container and said liner being sufficiently foraminous to provide fluid drainage.

13. A packaged shipping unit as described in claim 12 wherein said meat comprises fresh poultry carcasses.

14. A packaged shipping unit as described in claim 13 wherein said foraminous metal container comprises a substantially rectangular nesting, stacking, wire basket, and wherein said foraminous sheet liner comprises a heavy moisture-resistant paper cut from a substantially rectangular sheet of said paper which folds to form a generally box-like container which fits snugly within said wire basket, said liner having a lid section hingedly connected to the top edge of one side of said box-like container, said liner and said basket being adapted to freely drain fluids emanating from said ice and said poultry.

15. A packaged shipping unit as described in claim 13 wherein said ice completely surrounds said poultry so as to form a consolidated snowball-like body.

16. A packaged shipping unit as described in claim 12 wherein said foraminous sheet liner comprises a sheet material container formed from a generally rectangular blank which is cut and creased to provide: a bottom panel; side wall panels hinged to opposite edges thereof, said side wall panels adapted to be moved into upright side wall forming relation with the bottom panel; a lid panel hinged at one edge to the top edge of an upright side wall panel, said lid panel adapted to be moved into a parallel superimposed relation to said bottom panel; and at least one closure tab panel hingedly connected to an edge of said lid panel, said closure tab panel adapted to be moved into an overlapping contiguous relation with the exterior top portion of an upright side wall panel.

17. A packaged shipping unit as described in claim 16 wherein said sheet material container includes a retaining panel located at the interior of each vertical corner of said container, said retaining panel being hingedly connected to the vertical edge of one side wall panel forming said corner and said retaining panel being adapted to be moved into parallel contiguous relationship to the side wall panel adjacent to said side wall panel to which said retaining panel is connected.

18. A packaged shipping unit as described in claim 17 wherein said blank comprises a waxed, heavy, foldable, bleached, sulfate paper.

19. A packaged shipping unit as described in claim 16 wherein said sheet material container has an opening at the apex of the corner formed by the juncture of said bottom panel and two of said side wall panels adjacent to each other.

References Cited in the file of this patent
UNITED STATES PATENTS

| | | |
|---|---|---|
| 610,255 | Bisler | Sept. 6, 1898 |
| 626,563 | Raby | June 6, 1899 |
| 2,302,639 | Moore | Nov. 17, 1942 |
| 2,413,129 | Wilson | Dec. 24, 1946 |
| 2,470,465 | Broeren et al. | May 17, 1949 |
| 2,561,143 | Schmitz | July 17, 1951 |
| 2,930,707 | Linnell et al. | Mar. 29, 1960 |
| 3,072,281 | Reilly | Jan. 8, 1963 |